United States Patent Office 2,698,334
Patented Dec. 28, 1954

2,698,334

ARYLHALOSILANES

John B. Rust, Montclair, and Charles A. MacKenzie, Upper Montclair, N. J., assignors, by direct and mesne assignments, of one-half to Montclair Research Corporation, a corporation of New Jersey, and one-half to Ellis-Foster Company, a corporation of New Jersey No Drawing. Application March 27, 1945, Serial No. 585,203

5 Claims. (Cl. 260—448.2)

This invention relates to organo silane derivatives containing substituent groups particularly hydrocarbon groups such as aliphatic, carbocyclic and alicyclic groups; to processes of making such products; and to compositions containing the same.

Heretofore alkyl and aryl silicon derivatives have been made primarily by the action of alkyl and aryl magnesium halides on silicon halides or ethyl orthosilicate. It has also been reported that certain other metallic alkyls such as zinc and mercury alkyls could be employed.

Among the objects of the present invention is the production of silane derivatives obtained by economic and simple methods.

Other objects include the production of silane derivatives from hydrolyzed silane chlorides.

Still further objects include the production of such derivatives and their conversion into or utilization in silane plastics, lacquers and resins and for various other purposes, in good yield and by readily controllable, inexpensive processes.

Still further objects and advantages of the present invention will appear from the more detailed description set forth below, it being understood that such detailed description is given by way of illustration and explanation only, and not by way of limitation, since various changes therein may be made by those skilled in the art without departing from the scope and siprit of the present invention.

In accordance with the present invention, it has been found possible to utilize silicochloroform in the production of organo silane derivatives, as for example, silane derivatives by the action of chemical reactants resulting in compounds characterized by the presence of a hydrogen atom attached to silicon. Thus organo silane halides will contain the group

in which X is a halogen and R is a hydrocarbon or substituted hydrocarbon radical of aliphatic, carbocyclic or alicyclic type. Or if such halides are hydrolyzed or otherwise treated to replace the halogen present compounds are obtained which are characterized by the group

where R may have the significance set forth above. In polymeric form the hydrolyzed materials may contain a multiplicity of groups as illustrated in the following formula

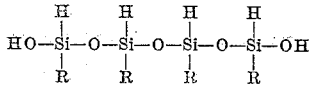

in which R may have the significance set forth above and the R group attached to the silicon may be the same or different.

The silicochloroform may be reacted with any reactants which give the desired component to produce the silane derivatives sought. For example, Grignard reagents or mixtures of Grignard reagents may be reacted with silicochloroform to give organo silane halides which may be utilized for various purposes as such, or hydrolyzed and otherwise treated to convert them into a variety of derivatives. In lieu of using a Grignard reagent which is preformed, the silicochloroform may be reacted in a one step process with metallic magnesium in the presence of a halohydrocarbon or with metallic lithium in the presence of a halohydrocarbon or with an organolithium compound to form corresponding organo silane halides which again as set forth above, may be hydrolyzed or otherwise treated to produce derivatives therefrom. The reaction of the silicochlorofrom with a reactant selected from the group consisting of a Grignard reagent, or of metallic magnesium together with a halohydrocarbon, or with metallic lithium together with a halohydrocarbon or an organo-lithium compound or an organo-sodium compound, etc. represents the preferred methods of producing such silane derivatives in accordance with the present invention and these will be particularly illustrated below.

In carrying out such reactions whether by two step methods where a Grignard reagent or mixtures of Grignard reagents are first prepared and then reacted with the silicochloroform or where the silicochloroform is reacted with metallic magnesium or metallic lithium in the presence of a halohydrocarbon, the first named process being conveniently referred to as a two step process, whereas the latter reaction may be conveniently referred to as a one step process, the silicochloroform may be used per se, or it may be employed in admixture with other silicon halides or silicon halide derivatives, as for example, the reactions may be carried out with the silicohaloform such as silicochloroform in the presence of or in admixture with a silicon halide such as silicon tetra chloride; or the silicochloroform may be reacted in the presense of or in admixture with a silicon oxyhalide such as a silicon oxychloride to give complex mixed derivatives; such procedures representing the utilization of the silicochloroform or related compound in reactions in which other silicon derivatives may also be present to modify the nature of the ultimate products obtained.

Any of these methods may be utilized to produce reaction products which may take the form for example, of substituted silane halides which may then be hydrolyzed with water to form silanols and silane oxides depending upon the degree of substitution, etc. In all of these cases, the silane derivatives contain hydrogen bonded to the silicon atom and while such compounds produced in accordance with the present invention will contain properties analogous to those of the silane derivatives conferred by alkyl or aryl, etc. groups and may approach closely in properties to methyl substituted derivatives, the silanes produced in accordance with the present invention which contain the hydrogen atom bonded directly to the silicon exhibit properties not obtainable with the silicon derivatives which do not contain such hydrogen bonded directly to the silicon, since the hydrogen in this position is rather reactive and hence may undergo treatment to produce various types of derivatives such as oxidation, halogenation, nitration, sulfonation, and so forth. Thus the products produced with hydrogen bonded to the silicon in accordance with the present invention may be caused to undergo further reaction involving such hydrogen atom and for example, a viscous liquid such as is formed by polymerizing a butyl siliconol may be further converted into a flexible resinous film by heating under oxidizing conditions whereby part of the hydrogen is removed and replaced by oxygen, thus effecting cross-linking.

As illustrative of the hydrocarbon substituents attached to the silicon in the silane derivatives of this invention, there may be used alkyl, aryl, olefinyl, alkenyl, alkynyl, arenyl, arynyl, alicyclic, cycloaromatic, aralkyl derivatives as illustrated by methyl, ethyl, propyl, butyl, amyl, hexyl, heptyl, octyl, vinyl, allyl, butenyl; the radicals from acetylene, methyl acetylene, propyl acetylene, cyclic hexyl, benzyl, phenyl, tolyl, xenyl, chlorphenyl, styryl, and radicals from such derivatives as phenyl acetylene, and so forth.

As indicated above, the silico derivative employed in accordance with the present invention is desirably silicochloroform but other silicohaloforms may be utilized such as silicobromoform, silicoiodoform, and the like, although these other compounds are in some cases spontaneously inflammable in the air and thus make handling somewhat more difficult than with silicohloroform. Accordingly the invention will be illustrated by the use of silicochloroform.

In reacting the silicochloroform with a Grignard reagent, the reaction may be carried out with an aryl or an alkyl magnesium halide for example, to form corresponding substituted organic silanes and mixtures of aryl magnesium halides or alkyl magnesium halides or aryl and alkyl magnesium halides, etc. may be employed, or the above derivatives may be formed using lithium instead of magnesium.

When the reactions are carried out by the one step methods in which a halohydrocarbon is reacted with the slicochloroform or related compound in the presence of magnesium or lithium, any desirable halohydrocarbon may be employed such as a chloride, bromide or iodide of an aliphatic, aromatic or cyclic non-aromatic hydrocarbon. Any such halohydrocarbon such as an alkyl or an aryl halide may be reacted with metallic magnesium or lithium in the presence of the silicochloroform or related compound and such reaction carried out in a variety of ways, as for example, the desired reacting components may be added simultaneously to the magnesium or the lithium, or a mixture of the silicochloroform or related compound with the halohydrocarbon may be added to the metallic magnesium or lithium, or the silicochloroform or the halohydrocarbon may be added separately to the metallic magnesium or lithium admixed with the other reacting component.

Desirably the temperature employed during the reaction is one in which refluxing takes place, such temperature being in part dependent on the nature of the reacting materials themselves, and the conditions such as whether or not superatmospheric pressure is maintained during the course of the reaction. The refluxing may be due to one of the organic reactants or to any solvent present, and most desirably the temperature is usually one at which refluxing takes place. Thus if ethyl ether is present, the temperature would be approximately 35° C. to obtain refluxing. If desired to obtain a higher temperature, the reaction may be carried out under pressure and the temperature of reaction may thus be elevated to about 40 or 50° C. Where no solvent is employed or high boiling materials such as xylene, butyl ether, etc. are present, the temperatures sometimes rise as high as 150° C. or higher. When the lower temperatures, such as 35° C. are used, as for example, with ethyl ether, it has been found desirable to maintain a rapid to moderate reflux in order to carry out the one step reactions of the present invention so as to obtain the best possible yields and refluxing conditions are also desirably employed and maintained at such moderately elevated temperatures when Grignard reagents are being utilized. Generally if the temperature is allowed to drop substantially, poorer yields result. Thus the conditions set forth that a temperature of about 30–35° C. be utilized is about the lowest permissible consonant with the desired yields. As regards the upper limit of temperature, this is rather flexible depending on operating conditions and temperatures as high as 200° C. may be utilized.

The reactions may be carried out either in the presence of or in the absence of a solvent, or if desired a solvent may be added at the end of the reaction to dilute the reaction mixture. When a solvent is employed it may be an ether or hydrocarbon such as an aromatic, aliphatic or alicyclic hydrocarbon and the like. In general, solvents may be used which are used in the formation of Grignard reagents. It has been found that in general, the concurrent reaction of the reactants as stated above, is accelerated by the presence of some solvent in which a Grignard reagent is easily formed, such as ethyl ether, butyl ether, ethyl orthosilicate and the like, or is accelerated by the presence of the Grignard reagent itself.

In addition, catalysts generally employed for accelerating Grignard reactions may be present. It has been found that the application of heat during the reaction is highly desirable and necessary for the higher yields and rapid production of the desired derivatives. In some cases, the heating is supplied due to the exothermic nature of the reaction but in general external heating must be employed.

To illustrate accelerating solvents or catalysts, mention may be made of ethyl orthosilicate which is generally exemplary of esters of orthosilicic acid that may be employed as such accelerating solvents or catalysts among which additionally there may be mentioned methyl orthosilicate, benzyl orthosilicate, and the like.

Where a solvent is used in the process and especially an ether solvent such as ethyl ether, the reaction proceeds rapidly. In some cases a violent reaction may occur. It has been found that excellent control may be achieved by the addition of one or both of the reactants to the metallic magnesium or lithium, slowly. Where the reaction does not proceed rapidly enough it may be accelerated by the application of heat. In these cases especially where a low boiling volatile halide is employed, it is necessary to carry out the reaction under pressure.

The proportions of the reaction ingredients may be varied substantially and may for example, vary from less than 1 mole of Grignard reagent or organic halide to 3 moles of Grignard reagent or organic halide based on 1 mole of the silicochloroform or mixtures containing it. When less than 1 mole of organic halide or Grignard reagent is used to 1 mole of silicochloroform, a mixture will be produced containing free silicochloroform and organo silane halide usually the latter being in the form of the mono substituted silane halide. Such mixtures are useful since they may be hydrolyzed and polymerized to produce mixed organo silane oxides and silico formic acid polymers in accordance with methods set forth below. The degree of substitution of the silicochloroform or related compound is controllable by varying the proportions of the reactants either the Grignard reagents, the magnesium metal, or the organic halide or a combination of such expedients. It is thus possible to produce, for instance, a mono-alkyl dihalogen silane, a di-alkyl mono-halogen silane, or a tri-alkyl silane or related derivatives. The control of the process of the present invention and the production of substantially pure substituted silane derivatives is surprising since in some cases at least it would be predictable on theoretical grounds that mixtures of all possible substituted silane halides and related derivatives would result.

Thus for example, in utilizing the one step methods referred to above and as will be exemplified in examples given below, a ratio of organic halide to silicochloroform may be used in which the molar ratio is 1 to 1. But as stated, the control of the substituent organo groups may be had through mole ratios of the reacting components. Thus in the stated one step reactions, the mole ratio of halohydrocarbon to silicochloroform may be equal to the ratio of the number of hydrocarbon groups to silicon in the desired organo silane derivative, sufficient magnesium or lithium being present to give the desired reaction; or the mole ratio of magnesium or lithium to halohydrocarbon may be made equal to the ratio of the number of hydrocarbon groups to silicon in the desired organo silane derivative. Thus the ratio of halohydrocarbon to silicochloroform or related compound to magnesium or lithium in the reaction may be 1:1:1 or 2:1:2 or 3:1:3 depending on the compounds desired. Or the organo silane halide may be prepared as set forth above by any of the indicated reactions, and then the reaction repeated to introduce an additional organo group in accordance with any of the methods set forth.

It has been pointed out above that while any silicohaloform may be employed in carrying out these reactions, that the silicochloroform is most desirably used but that it may be used either alone or in admixture with other silicon derivatives capable of forming desired reaction products and the silicon halides such as the tetrahalides including silicon tetrachloride, silicon tetrabromide and silicon tetraiodide may be employed in admixture with the silicochloroform or related compound in carrying out the reactions. Other derivatives that can be utilized include silicon tetrafluoride, disilicon hexahalides, trisilicon octahalides, and polysilicon polyhalides, silicon oxychlorides and the like. Where such mixed reactants are employed either without mixed halohydrocarbons or mixed Grignard reagents, very complex mixtures of materials can be obtained.

The silane products prepared according to the above descriptions may be preserved for future use by placing them in solvents, although the simple substituted silicon halides may be utilized in relatively pure form as produced without any solvents. These halides which in many cases are readily distillable may be utilized per se or may serve as intermediates in the production of various other derivatives as will be illustrated below. A large variety of solvents may be employed for use with such silane products including hydrocarbon solvents, both aliphatic and aromatic such as hexane, benzene, toluene and so forth, ethers such as dimethyl, diethyl, diisopropyl, dibutyl ethers and cyclic ethers such as dioxan or diethers such as diethyl ether or ethylene glycol or mixed ethers, esters such as ethyl, butyl or amyl acetates, propionates, butyrates and the like. As indicated above, solvents may be added during the reaction itself or at a later stage. When the use of a solvent is desired, it is sometimes advantageous to add the solvent to the reaction mixture before it is poured on ice when hydrolysis is being carried out. Other types of silane derivatives may be obtained by adding a moist alcohol to the halide silicochloroform. In such instances, the alkoxy group partially replaces the halide on the silicochloroform.

A variety of other derivatives may be formed by reacting the organosilane halides with various reactants, as for example, with alcohols, including aliphatic alcohols or phenols, cycloaromatic or alicyclic alcohols such as cyclohexanol and the like, glycols, amines, acid salts and the like. Or they may be hydrolyzed in water and converted into tough plastic materials by the application of heat or catalysts or both. Other uses will appear hereinafter. Derivatives produced with the use of alcohols as set forth above are generally mobile to viscous oils and may be utilized for a variety of purposes or they may be hydrolyzed in water and the hydrolytic products utilized.

Among the utilizations of these silane derivatives produced as set forth above, it has been pointed out that the substituted silane chlorides may be reacted with hydroxy compounds or they may be hydrolyzed and used in a solvent. The hydrolyzed or partially hydrolyzed derivatives may be esterified or partially esterified or acylated or partially acylated. Acylated derivatives are readily produced by treating the silanol derivatives with an acylating agent particularly an esterifying agent selected from the group of carboxylic acid chlorides and carboxylic acid anhydrides, as for example, acetic anhydride, acetyl chloride, stearoyl chloride, maleic anhydride, beta chloropropionyl chloride, phthalic anhydride, benzoyl chloride, etc. Acylation may desirably be carried out particularly when the acid chlorides are utilized, in the presence of some agent which binds any hydrochloric acid which is formed, as for example, a tertiary amine such as pyridine, quinoline, alpha picoline, dimethyl benzyl amine, dimethyl aniline, trimethyl-, triethyl-, etc. amine, ethyl morpholine, and the like. The acylation reactions are readily carried out with the respective stated ingredients by heating the same together at moderate temperatures, as for example, from 100 to 150° C. for several hours desirably under a reflux condenser. The ethers and acylates thus produced may be generally characterized by a formulation such as $$R_x\text{---Si.H.}(OR_1)_{3-x}$$

where $x$ is an integer or fraction less than 3 and R is any of the hydrocarbon substituents groups set forth above including alkyl, aryl, alkaryl, alphyl, olifinyl, alkenyl, alkynyl, aralkenyl, cycloaryl, and the like, and $R_1$ may be any of the above stated groups as well as hydrogen and also $R_2CO$, where $R_2$ may be any of the above stated groups as well as hydrogen. Or where an unsubstituted hydroxyl group is present the formulation may be $$R_x\text{---Si.H.OH.}(OR_1)_{2-x}$$

where $x$ is an integer or fraction less than 2 and R and $R_1$ have the significance referred to above.

Among the utilizations of organo silane derivatives prepared in accordance with this invention as set forth above, there may be particularly emphasized certain uses as set forth below. They may be used as lacquers or adhesives either alone or in admixture with either completely reacted or potentially reacted resins together with or without solvents, etc. Such resins include natural resins such as rosin, copal, shellac and so forth, as well as synthetic resins including urea-aldehyde resins, phenol-aldehyde resins, melamine resins, aniline aldehyde resins, acetone formaldehyde resins, alkyd resins, cumarone resins, polymerized vinyl derivatives and vinyl resins, polymerized acrylic resins including the esters of acrylic and methacrylic acids, and so forth.

They may be used in the production of insulating varnishes, as a binder for asbestos, wood, mica and the like, or as viscous or mobile liquids may be obtained which may serve as heat transfer and pressure transfer liquids. These materials exhibit very little change in viscosity over a wide range of temperature and furthermore exhibit excellent thermal stability even when heated at high temperatures for long periods of time. The fact that organo substituted silane derivatives are capable of forming resin-like, glass-like amorphous masses is surprising since there has been no prior disclosure that such high polymers could be obtained.

The products when hydrolyzed in water and subsequently heated may be converted into products ranging from hard tough plastic materials to viscous or mobile liquids. These are the hydrolytic products and may be dissolved in suitable solvents and used as baking lacquer materials.

The silane derivatives of this invention may be used as textile finishing compounds, either alone or in solution in solvents or in the form of vaporized materials to produce special effects on textile materials such as waterproofing, crease-proofing, wrinkle-proofing, slip-proofing, and so forth.

The silane derivatives either alone or in admixture with other additives including resins as set forth above, may be mixed with various inorganic or organic fillers and used for hot molding, extruding, casting and so forth. Objects having an excellent strength and highly resistant to water and organic solvents may thus be produced. The inorganic fillers include both fibrous and non-fibrous materials such as clays like bentonite, mica, asbestos, glass or cellulosic materials such as paper, cotton, wood flour, and so forth.

The silane derivatives prepared in accordance with the process of the present invention may be used as lubricating oils and also for inclusion with vegetable oils, particularly the drying oils such as linseed oil, China-wood oil and so forth, as well as with semi-drying oils and with the non-drying oils. They may also be utilized with the hydrocarbon oils, as for example, lubricants to produce special types of lubricating compositions.

In view of their excellent electric properties, the silane derivatives may be used either per se or as varnishes, etc. in producing coatings or coated articles for electrical insulation and so forth. These silane derivatives may also be used in the production of laminated products for bonding together two or more sheets of the same or different organic or inorganic materials. They may also be utilizable as plasticizers as well as binders and their utilization for such purposes may be controlled by the number or type or both of the alkyl or aryl or other substituents introduced into the derivative.

The following examples illustrate various phases of the invention. In the first example, an ethyl silicochloroform is produced by a two step process.

*Example 1.*—One mole of ethyl magnesium bromide was prepared in one liter of ether. The Grignard reagent was added dropwise to an ice cold solution of 134.5 grams (1 mole) of silicochloroform in 500 ml. of ether. After the addition the mixture was stirred for one hour at room temperature. The ether layer was decanted and subjected to fractional distillation. There was obtained a product boiling at 74.0° C.

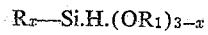

$$\text{Density} = 1.095 \,\frac{25°}{4°}$$

| | |
|---|---|
| Mol. wt. (calc. for $C_2H_5SiHCl_2$) | 129.0 |
| Mol. wt. (found) | 127.5 |
| Per cent chlorine (calc.) | 55.0 |
| Per cent chlorine (found) | 55.7 |

Butyl silicochloroform is prepared in the next example by the action of a mixture of butyl bromide and silicochloroform on magnesium turnings in ether.

*Example 2.*—Twelve grams of magnesium (0.5 g. atom) and 500 ml. of diethyl ether were placed in a 3-neck flask equipped with a stirrer, condenser and dropping funnel. The reaction was started by adding 3 ml. of butyl bromide and heating the contents of the flask. A mixture of butyl bromide 68.5 grams (0.5 mole less the 3 ml. mentioned above) and 67.89 (0.5 mole) of silicochloroform was added dropwise rapidly enough to maintain a vigorous reaction at an elevated temperature. After the addition of the mixture the contents of the flask was stirred for 1 hour. The ether solution was decanted from the solid and the solid was washed with four 100 ml. portions of ether. The ether extract was added to the decanted solution and the whole subjected to distillation. After removal of the ether a material boiling at 120°–130° C. was obtained. Redistillation of this fraction gave a product boiling 127°–128° C.

Phenyl silicochloroform is prepared in the next example by the action of phenyl magnesium bromide on silicochloroform.

*Example 3.*—One mole of phenyl magnesium bromide in 1 liter of ether was added dropwise to an ice cold solution of one mole of silicochloroform in 500 ml. of ether. After the addition of the Grignard reagent, stirring of the mixture was continued for one hour. The ether solution was then decanted and fractionally distilled. Material was collected boiling 170°–200° C. Redistillation of this fraction gave a product boiling 180°–182° C.

$$\text{Density} = 1.225 \ \frac{25°}{4°}$$

Per cent chlorine (calc. for $C_6H_5SiHCl_2$) -------- 40.0
Per cent chlorine (found) -------------------- 37.0

The next example shows the preparation of mono-amyl silicochloroform by a one step process.

*Example 4.*—In a two liter, 3-neck flask equipped with a stirrer, condenser and dropping funnel were placed 12.2 g. (0.5 gram atom) of magnesium turnings and 500 ml. of ether. A Grignard reaction was started in the flask by the addition of one ml. of ethyl bromide. A mixture of 62.1 ml. (0.5 mole) of n-amyl bromide and 55.3 ml. (0.5 mole) of silicochloroform was then added at such a rate that vigorous refluxing was maintained. After the complete addition of the mixture the contents of the flask was stirred for one hour. The ether layer was then separated from the solid and subjected to fractional distillation. A product was obtained boiling 151°–152° C. A small sample of the material was hydrolyzed by pouring an ether solution of it on ice. The ether layer was separated and a film of it was poured on a glass plate and heated at 180° C. for 2 hours. A hard, clear, brittle film was formed. When the ether was evaporated from the main portion of the hydrolyzed product a clear, colorless mobile liquid was obtained.

In the next example there is described the preparation of a mixture of ethyl silicochloroform and ethyl silicon trichloride.

*Example 5.*—The mixture of silicon chlorides obtained in the preparation of silicochloroform was used. This mixture had an approximate composition by weight of 80% silicochloroform and 20% silicontetrachloride. One-half a mole of ethyl magnesium bromide was prepared in 500 ml. of ether. One-half mole of mixed chlorides (described above) was placed in a three-necked flask together with 200 ml. of ether. The mixture was stirred and the ethyl magnesium bromide added slowly to it. After addition of the ethyl magnesium bromide the mixture was stirred at room temperature for one hour. It was then allowed to stand for several hours after which time the solution was decanted from the solid. Fractional distillation yielded ethyl silicon trichloride (boiling 97°–100° C.) and ethyl silicochloroform (boiling 71°–74° C.). A few mls. of a high boiling residue remained in the distilling flask.

A few mls. of the ether solution was taken just prior to the distillation and hydrolyzed by pouring on ice. The ether layer was separated and dried and a film was poured on glass. Heating for several hours at 120° C. produced a clear, hard solid polymer.

The next example describes the hydrolysis of butyl silicochloroform together with a description of some of the properties of the hydrolyzed product.

*Example 6.*—29 grams of butyl silicochloroform was mixed with three times its volume of diethyl ether. The mixture was poured on cracked ice and the ether layer was separated and washed with water to remove hydrogen chloride. The ether solution was dried over calcium chloride. Evaporation of the ether left 19.0 grams of liquid hydrolyzed product.

The silicol formed as described above had a pleasant odor. It showed great heat resistance. When a few grams of the liquid were heated in a Wood's metal bath the temperature reached 540° C. before evidence of decomposition was noticed. Density figures are given below for the product before and after heating.

$$\text{Density before heating} = 0.901 \ \frac{25°}{4°}$$

$$\text{Density after heating} = 0.947 \ \frac{25°}{4°}$$

The heated product was more viscous than the unheated sample.

The molecular weight of the hydrolyzed product was determined by observing the lowering in melting point of camphor when the sample and camphor were mixed. The value obtained for the molecular weight was 426. This value approximates the value obtained (437) if it is assumed that four molecules combined with the elimination of water. A suggested formula would be the following:

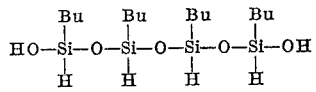

The hydrolysis of phenyl silicochloroform is described in the next example.

*Example 7.*—Phenyl silicochloroform, mixed with three times its volume of ether, was hydrolyzed by pouring on cracked ice. The ether layer was washed with water to remove hydrogen chloride, and then dried over calcium chloride. After removal of the ether, a clear, colorless moderately viscous liquid was obtained. Before the removal of the ether a film of the mixture was poured on a glass plate. When the ether had evaporated, a clear film remained adhering smoothly to the glass plate. When the film was heated for about one-half hour at 60° C. a soft, non-tacky film was obtained. Further heating for an hour at 120° C. produced a clear, hard film.

The hydrolysis of ethyl silicochloroform is described in the following example:

*Example 8.*—Ethyl silicochloroform was mixed with four times its volume of benzene and the mixture was poured on cracked ice. The benzene layer was separated and concentrated by distillation; the distillation also served in removing the water present. A film of the product was poured on glass and heated at 120° C. for several hours; a hard, clear film was obtained.

The preparation of n-hexyl silicochloroform is illustrated in the following example.

*Example 9.*—A Grignard reagent was prepared using 120 g. (0.73 mole) of n-hexyl bromide, 17.5 g. (0.73 g. atoms) of magnesium turnings, and 500 ml. of diethyl ether. The Grignard solution was added to a cooled, stirred solution of 90 g. (0.66 mole) of silicochloroform in 200 ml. of diethyl ether. After the addition was complete the mixture was stirred at room temperature for 1 hour. The ether layer was separated from the salt and subjected to fractional distillation. There was obtained a product boiling 172°–175° C.

A method of preparation of triethylsilane is given in the following example:

*Example 10.*—Three moles of ethyl magnesium bromide in 500 ml. of diethyl ether, was added dropwise to a cold solution of one mole of silicochloroform in 500 ml. of ether. When the addition of the Grignard reagent was complete the mixture was stirred for one hour. The ether layer was then decanted from the solid and fractionally distilled. Triethylsilane was obtained boiling at 123° C.

To illustrate the preparation of diethyl silicochloroform the following example is given.

*Example 11.*—Two moles of ethyl magnesium bromide, in 500 ml. ether, was added dropwise to a cold solution of one mole of silicochloroform in 500 ml. of ether. After the addition of the Grignard reagent was complete, the mixture was stirred at room temperature for one hour. The ether layer was then decanted from the solid and fractionally distilled. Diethyl silicochloroform was obtained boiling at 104°–106° C.

Having thus set forth our invention, we claim:
1. An organo-chlorosilane having the general formula

wherein R represents a mono-cyclic aryl radical.
2. Monophenyl-dichlorosilane.
3. An organo-chlorosilane having the formula

where R is a monocyclic aryl radical $R^1$ is halogen and $R^2$ is selected from the group consisting of R and halogen.
4. An organo-chlorosilane having the formula

where R is phenyl, $R^1$ is halogen and $R^2$ is selected from the group consisting of R and halogen.
5. A polymeric silicon derivative having the formula

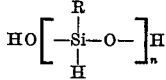

where $n$ is a multiplicity of the bracketed radical and R is phenyl.

References Cited in the file of this patent

UNITED STATES PATENTS

| Number | Name | Date |
|---|---|---|
| 2,030,739 | Bley | Feb. 11, 1936 |
| 2,238,669 | Wiley | Apr. 15, 1941 |
| 2,258,218 | Rochow | Oct. 7, 1941 |
| 2,306,222 | Patnode | Dec. 22, 1942 |
| 2,380,998 | Sprung et al. | Aug. 7, 1945 |
| 2,386,259 | Norton | Oct. 9, 1945 |
| 2,386,452 | Fleming | Oct. 9, 1945 |
| 2,389,477 | Wright | Nov. 20, 1945 |
| 2,390,378 | Marsden | Dec. 4, 1945 |
| 2,414,505 | Arntzen | Jan. 21, 1947 |
| 2,476,529 | Barry | July 19, 1949 |

OTHER REFERENCES

Luff and Kipping, "Jour. Chem. Soc." (London), vol. 93, pp. 2004–16 (1908).

Martin and Kipping, "Jour. Chem. Soc." (London), vol. 95, pp. 302–14 (1909).

Stock, "Berichte deut. chem. Gesell," vol. 52, pp. 708–13 (1919).

Beilstein, "Handbuch der org. Chem., 4th ed., vol. IV, p. 626 (1922).

Reynolds et al., "Jour. Chem. Soc.," vol. 51, pp. 3067–72 (1929).

Kraus et al., "Jour. Am. Chem. Soc.," vol. 56, p. 196 (1934).

Schumb et al., "Jour. Am. Chem. Soc.," vol. 61 (1939) pp. 363–366.

Volnov et al., "Jour. Gen. Chem." (USSR), vol. 10 (1942), pp. 1600–1604. (Translation of 8 pages available in Div. 31, received March 21, 1945, pages 2 and 3 only pertinent.)

Rochow, "Chemistry of the Silicons" (1946), page 110, Wiley and Sons, Publishers, N. Y.